(12) United States Patent
Kosche et al.

(10) Patent No.: US 7,707,554 B1
(45) Date of Patent: Apr. 27, 2010

(54) ASSOCIATING DATA SOURCE INFORMATION WITH RUNTIME EVENTS

(75) Inventors: Nicolai Kosche, San Francisco, CA (US); Robert E. Cypher, Saratoga, CA (US); Mario I. Wolczko, San Carlos, CA (US); John P. Petry, San Diego, CA (US); Adam R. Talcott, San Jose, CA (US)

(73) Assignee: Oracle America, Inc., Redwood Shores, CA (US)

(*) Notice: Subject to any disclaimer, the term of this patent is extended or adjusted under 35 U.S.C. 154(b) by 1670 days.

(21) Appl. No.: 10/880,485

(22) Filed: Jun. 30, 2004

Related U.S. Application Data

(60) Provisional application No. 60/564,035, filed on Apr. 21, 2004.

(51) Int. Cl.
G06F 9/44 (2006.01)
(52) U.S. Cl. .................. 717/127; 717/130; 717/131; 714/38; 714/47; 712/227
(58) Field of Classification Search ............ 717/151, 717/158, 159; 712/10; 714/47; 713/300
See application file for complete search history.

(56) References Cited

U.S. PATENT DOCUMENTS

| | | | | |
|---|---|---|---|---|
| 4,821,178 A | * | 4/1989 | Levin et al. ............ | 714/47 |
| 5,440,722 A | * | 8/1995 | VanderSpek et al. ...... | 714/43 |
| 5,526,499 A | | 6/1996 | Bernstein et al. | |
| 5,768,500 A | * | 6/1998 | Agrawal et al. .......... | 714/47 |
| 5,909,574 A | * | 6/1999 | Meyer .................. | 712/244 |
| 5,948,095 A | | 9/1999 | Arora et al. | |
| 5,964,867 A | | 10/1999 | Anderson et al. | |
| 6,000,044 A | | 12/1999 | Chrysos et al. | |
| 6,021,261 A | * | 2/2000 | Barrett et al. ........... | 714/37 |
| 6,092,180 A | | 7/2000 | Anderson et al. | |
| 6,098,166 A | | 8/2000 | Leibholz et al. | |
| 6,134,710 A | * | 10/2000 | Levine et al. ........... | 717/158 |
| 6,289,506 B1 | | 9/2001 | Kwong et al. | |
| 6,308,261 B1 | | 10/2001 | Morris et al. | |
| 6,314,431 B1 | | 11/2001 | Gornish | |
| 6,343,295 B1 | * | 1/2002 | MacLeod et al. ........ | 707/103 R |
| 6,347,079 B1 | * | 2/2002 | Stephens et al. ......... | 370/255 |

(Continued)

FOREIGN PATENT DOCUMENTS

WO    WO 01/44927 A2    6/2001

OTHER PUBLICATIONS

Alpern, B. et al., "The Jalapeno Virtual Machine," *IBM Systems Journal*, vol. 39, No. 1, 2000, pp. 211-238.

(Continued)

*Primary Examiner*—Lewis A Bullock, Jr.
*Assistant Examiner*—Jue Wang
(74) *Attorney, Agent, or Firm*—Dorsey & Whitney LLP

(57) ABSTRACT

Associating data source information with sampled runtime events allows identification of system components related to the sampled runtime events. Code can be optimized from the perspective of system components and for various architectures. A system provides a data source indication. The system associates the data source indication with a corresponding instruction instance. The instruction instance is related to a sampled runtime event, and the sampled runtime event is associated with the data source indication. The data source information and associated sampled runtime event can be supplied for profiling code.

56 Claims, 9 Drawing Sheets

U.S. PATENT DOCUMENTS

| | | | |
|---|---|---|---|
| 6,427,235 B1 | 7/2002 | Kosche et al. | |
| 6,560,648 B1* | 5/2003 | Dunn et al. | 709/224 |
| 6,564,297 B1 | 5/2003 | Kosche | |
| 6,567,975 B1 | 5/2003 | Damron | |
| 6,574,713 B1 | 6/2003 | Kosche et al. | |
| 6,625,660 B1 | 9/2003 | Guthrie et al. | |
| 6,643,267 B1* | 11/2003 | Karia et al. | 370/252 |
| 6,651,245 B1 | 11/2003 | Damron et al. | |
| 6,671,878 B1 | 12/2003 | Bliss | |
| 6,675,374 B2 | 1/2004 | Pieper et al. | |
| 6,675,380 B1 | 1/2004 | McKinsey et al. | |
| 6,678,796 B1 | 1/2004 | Kosche et al. | |
| 6,681,317 B1 | 1/2004 | Mathews | |
| 6,697,932 B1 | 2/2004 | Yoaz et al. | |
| 6,748,589 B1 | 6/2004 | Johnson et al. | |
| 6,785,796 B1 | 8/2004 | Damron et al. | |
| 6,792,563 B1* | 9/2004 | DesRosier et al. | 714/43 |
| 6,880,073 B2 | 4/2005 | Arimilli et al. | |
| 6,918,111 B1 | 7/2005 | Damron et al. | |
| 7,069,176 B2* | 6/2006 | Swaine et al. | 702/176 |
| 7,111,177 B1* | 9/2006 | Chauvel et al. | 713/300 |
| 7,200,776 B2* | 4/2007 | Harris | 714/45 |
| 2002/0010913 A1 | 1/2002 | Ronstrom | |
| 2002/0056078 A1 | 5/2002 | Inagaki | |
| 2003/0074653 A1 | 4/2003 | Ju et al. | |
| 2003/0101336 A1 | 5/2003 | Kosche et al. | |
| 2003/0101443 A1 | 5/2003 | Kosche et al. | |
| 2003/0105942 A1 | 6/2003 | Damron et al. | |
| 2003/0145314 A1* | 7/2003 | Nguyen et al. | 717/158 |
| 2003/0229823 A1* | 12/2003 | Swaine et al. | 714/25 |
| 2004/0250045 A1* | 12/2004 | Dowling | 712/10 |
| 2005/0038813 A1* | 2/2005 | Apparao et al. | 707/104.1 |
| 2005/0050534 A1* | 3/2005 | Luk et al. | 717/159 |
| 2005/0086652 A1* | 4/2005 | Tian et al. | 717/151 |

OTHER PUBLICATIONS

Anderson, Jennifer et al., "Continuous Profiling (It's 10:43; Do You Know Where Your Cycles Are?),"abstract for presentation at HOT Chips 9, Stanford, CA, August 1997, 2 pages, retrieved from the Internet at URL http://h30097.www3.hp.com/dcpi/publications.htm.

Anderson, Jennifer et al., "Instruction-Level Profiling on In-Order and Out-of-Order Processors," DEC presentation by Jeff Dean at Duke University, Dec. 3, 1997, 42 pages, retrieved from the Internet at URL http://h30097.www3.hp.com/dcpi/publications.htm.

Anderson, Jennifer M. et al., "Continuous Profiling: Where Have All the Cycles Gone?" *16th ACM Symposium on Operating Systems Principles*, St. Malo, France, Oct. 5-8, 1997, 20 pages.

Anderson, Jennifer et al., "Transparent, Low-Overhead Profiling on Modern Processors," *Proceedings of the Workshop on Profile and Feedback-Directed Compilation*, in conjunction with *International Conf. on Parallel Architectures and Compilation Techniques (PACT98)*, Paris, France, Oct. 13, 1998, 5 pages.

Anderson, Jennifer et al., "Continuous Profiling: An Electron Microscope for Your Computer," presentation by Mark Vandevoorde to Silicon Valley summer interns, Palo Alto, CA, Aug. 13, 1999, 18 pages.

Armstrong, Eric, "HotSpot: A new breed of virtual machine," *Java World*, Mar. 1998, 11 pages, retrieved from the Internet at URL http://www.javaworld.com.

Berrendorf, Rudolf and Ziegler, Heinz, "PCL—The Performance Counter Library: A Common Interface to Access Hardware Performance Counters on Microprocessors (Version 1.2)," Technical Report FZJ-ZAM-IB-9816, Julich, Germany, Oct. 1998, pp. 1-50.

Berc, Lance et al., "DIGITAL Continuous Profiling Infrastructure," DIGITAL Continuous Profiling Infrastructure Project, OSDI '96 Work-in-Progress Presentation, 2 pages, retrieved from the Internet at URL http://h30097.www3.hp.com/dcpi/publications.htm.

Berc, Lance and Vandevoorde, Mark, "Hardware Support for Out-of-Order Instruction Profiling on Alpha 21264a," HotChips 11, Stanford, CA, USA, Aug. 17, 1999, 21 pages.

Browne, Shirley et al., "A Scalable Cross-Platform Infrastructure for Application Performance Tuning Using Hardware Counters," *Proceedings of SC2000*, Dallas, TX, Nov. 2000, 10 pages.

Burrows, Mike et al., "Efficient and Flexible Value Sampling," *Architectural Support for Programming Languages and Operating Systems (ASPLOS-IX)*, Nov. 1-3, 2000, pp. 1-19.

Chilimbi, Trishul M. et al., "Cache-Conscious Structure Layout," *Proceedings of the ACM SIGPLAN '99 Conf. on Programming Language Design and Implementation*, May 1999, 12 pages.

Chilimbi, Trishul J., et al., "Cache-Conscious Structure Definition," *Proceedings of the ACM SIGPLAN '99 Conf. on Programming Language Design and Implementation*, May 1999, 12 pages.

Dean, Jeffrey et al., "ProfileMe: Hardware Support for Instruction-Level Profiling on Out-of-Order Processors," 1997 IEEE in *Proceedings of Micro-30*, Research Triangle Park, NC, Dec. 1-3, 1997, 12 pages.

DeRose, Luiz et al., "SIGMA: A Simulator Infrastructure to Guide Memory Analysis," *Conf. on High Performance Networking and Computing Proceedings of the 2002 ACN/IEEE Conf. on Supercomputing*, Baltimore, MD, 2002, 13 pages.

Itzkowitz, Marty et al., "Memory Profiling Using Hardware Counters," in *Conf. on High Performance Networking and Computing Proceedings of the 2003 ACM/IEEE Conf. on Supercomputing*, Phoenix, AZ, Nov. 15-21, 2003, pp. 1-12.

Lebeck, Alvin R., "Cache Conscious Programming in Undergraduate Computer Science," *ACM SIGCSE Technical Symposium on Computer Science Education (SIGCSE '99), Proceedings of the 30th SIGCSE Tech Symposium on Comp. Sci. Edu.*, New Orleans, LA, USA, Mar. 24-28, 1999, 5 pages.

Lipasti, Mikko H. et al., "SPAID: Software Prefetching in Pointer- and Call-Intensive Environments," *Micro 28 Proceedings of the 28th Annual International Symposium on Microarchitecture*, Nov. 29-Dec. 1, 1995, Ann Arbor, MI, 6 pages.

Luk, Chi-Keung and Mowry, Todd, "Compiler-Based Prefetching for Recursive Data Structures," APLOS-VII, *Proceedings of the Seventh International Conf. on Architectural Support for Programming Languages and Operating Systems*, Cambridge, MA, Oct. 1-5, 1996, 12 pages.

Martonosi, Margaret et al., "MemSpy: Analyzing Memory System Bottlenecks in Programs," *Proceedings of the1992 ACM SIGMETRICS Joint Int'l. Conf. on Measurement and Modeling of Computer Systems*, Newport, RI, USA, Jun. 1-5, 1992, pp. 1-12.

Mowry, Todd C. et al., "Design and Evaluation of a Compiler Algorithm for Prefetching," ASPLOS- V, *Proceedings of the Fifth International Conf. on Architectural Support for Programming Languages and Operating Systems*, Boston, MA, USA, Oct. 12-15, 1992, pp. 62-73.

Rubin, Shai et al., "An Efficient Profile-Analysis Framework for Data-Layout Optimizations," *Proceedings of the 29th ACM SIGPLAN-SIGACT Symposium on Principles of Programming Languages*, Portland, OR USA, Jan. 16-18, 2002, 14 pages.

Sprunt, Brinkley, "The Performance Monitoring Features of the Pentium 4 Processor," *IEEE Micro*, vol. 22, No. 4, Jul. 2002, pp. 32-42.

Sridharan, K., "VTune: Intel's Visual Tuning Environment," Proceedings of USENIX-NT Windows NT Workshop, Aug. 11, 1997, Seattle, CA, USA, retrieved from the Internet at URL http://www.usenix.org/publications/library/proceedings/usenix-nt97/presentations/sridhar.html, 24 pages.

"Program Performance Analysis Tools," Sun Microsystems, Inc. Publication 817-0922-10, May 2003, retrieved from the Internet at URL http://docs.sun.com/source/817-09221, 244 pages.

Venners, Bill, "The HotSpot Virtual Machine, How HotSpot Can Improve Java Program Performance and Designs," *Artima Developer*, May 1998, 7 pages, retrieved from the Internet at URL http://www.artima.com.

Walker, Kip et al., "Using Interpretation for Profiling the Alpha 21264a," presented at Carnegie Mellon University, Oct. 1999, 29 pages.

Weihl, William E., "Digital Continuous Profiling Infrastructure," Jun. 2004, 3 pages, retrieved from the Internet at URL http://www.research.digital.com/SRC/dcpi.html.

"The Java HotSpot Performance Engine Architecture," *Digital Forefront Magazine*, Winter 1997, pp. 27-28, retrieved from the Internet at URL http://java.sun.com/products/whitepaper.html.

* cited by examiner

ASSOCIATING DATA SOURCE INFORMATION WITH RUNTIME EVENTS

BACKGROUND

1. Field of the Invention

The present invention relates to the field of program analysis. More specifically, the present invention relates to code profiling.

2. Description of the Related Art

Profiling code aids developers in identifying sections of code that consume excessive amounts of execution time, or which otherwise affect performance, operation or correctness of software. Profiling provides developers data that aids in accomplishing the task of optimizing code.

In general, two major classes of profiling techniques exist: code instrumentation and hardware assisted profiling. Code instrumentation techniques typically include the insertion of instructions into the instruction stream of a program to be profiled. In crude form, programmer insertion of printf source statements may be employed to profile code. More sophisticated approaches may employ compiler facilities or options to insert appropriate instruction or operations to support profiling. Upon execution of the instrumented code, execution characteristics are sampled, in part by operation of the added instructions. Typically, code instrumentation techniques impose overhead on original program code so instrumented and, unfortunately, the insertion of instructions into the instruction stream may itself alter the behavior of the program code being sampled.

Hardware assisted profiling techniques have been developed, in part, to address such limitations by off loading some aspects to dedicated hardware such as event counters. Practical implementations often employ aspects of code instrumentation and hardware assistance. In some cases, profiling support is included in, or patched into, exception handler code to avoid imposing overhead on each execution of a sampled instruction. Suitable hardware event counters are provided in advanced processor implementations such as those in accordance with the SPARC® and Alpha processor architectures. SPARC architecture based processors are available from Sun Microsystems, Inc, Santa Clara, Calif. SPARC trademarks are used under license and are trademarks or registered trademarks of SPARC International, Inc. in the United States and other countries. Products bearing SPARC trademarks are based upon an architecture developed by Sun Microsystems. Systems that include Alpha processors are available from a number of sources including Compaq Computer Corporation.

One reasonably comprehensive hardware assisted profiling environment is provided by the Digital Continuous Profiling Infrastructure (DCPI) tools that run on Alpha processor systems to provide profile information at several levels of granularity, from whole images down to individual procedures and basic blocks on down to detailed information about individual instructions, including information about dynamic behavior such as cache misses, branch mispredicts and other forms of dynamic stalls. Additional descriptive information appears in Jennifer Anderson, Lance Berc, George Chrysos, Jeffrey Dean, Sanjay Ghemawat, Jamey Hicks, Shun-Tak Leung, Mitch Lichtenberg, Mark Vandevoorde, Carl A. Waldspurger, William E. Weihl, "Transparent, Low-Overhead Profiling on Modern Processors," in *Proceedings of the Workshop on Profile and Feedback-Directed Compilation* in conjunction with the *International Conference on Parallel Architectures and Compilation Techniques* (PACT 98), Paris, France (Oct. 13, 1998).

While conventional profiling tools often provide per image, per procedure, per source line, or per instruction level profile information, these tools do not provide profile information in relation to other aspects of code behavior. In particular, conventional profiling tools do not provide information that reveals relationships between runtime events and system components. System-level analysis can indicate that particular system components have causal relationships with a relatively large proportion of runtime events. Accordingly, a technique is desirable that reveals, for a given execution sequence of code, relationships between runtime events and system components.

SUMMARY OF THE INVENTION

It has been discovered that associating data source information with runtime events allows identification of system components that cause runtime events. Code can be optimized from the perspective of system components and for various architectures. For example, associating a memory component with a runtime event provides insight into the data path, data source, and/or system component communications related to the runtime event.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 1A depicts an exemplary data request between system components according to some realizations of the invention. FIG. 1B depicts exemplary interaction between system components and association of data source information with an instruction instance according to some realizations of the invention.

FIG. 7 depicts a small multi-processor system according to some realizations of the invention. FIG. 8 depicts an exemplary large system according to some realizations of the invention.

DESCRIPTION OF THE PREFERRED REALIZATION(S)

The description that follows includes exemplary systems, methods, techniques, instruction sequences and computer program products that embody techniques of the present invention. In particular instances, realizations are described with respect to systems that employ code profiling mechanisms, such as SPARC based systems and Alpha-based systems. However, it is understood that the described invention may be practiced without these specific details. In other instances, well-known protocols, structures and techniques have not been shown in detail in order not to obscure the invention.

In the following description, references are made to runtime events and instruction instances. The term runtime event describes events that occur during execution of code, typically corresponding to system performance. Runtime events represent cache misses, cache references, data translation buffer misses, data translation buffer references, branch mispredicts, etc. Runtime events are basically events that occur during execution of code. Runtime events are generally of interest because they hinder execution. Execution hindrance is sometimes revealed in terms of execution time, hence runtime events may consume execution time, or are associated with consumption of execution time. Sampled runtime events are a subset of runtime events and statistically represent runtime events. The term instruction instance describes an instance of an instruction or machine operation, such as a macro instruction or micro instruction that is executed by a processor. For example, an instruction instance may be an instance of read type instruction, write type instruction, etc. A runtime event may result from execution of such an instruction instance in program code.

For purposes of description, certain aspects of the present invention are detailed in the context of profiling that includes identification of system components corresponding to runtime events. More generally, profiling includes association of runtime events with data source information.

Figure 1A:
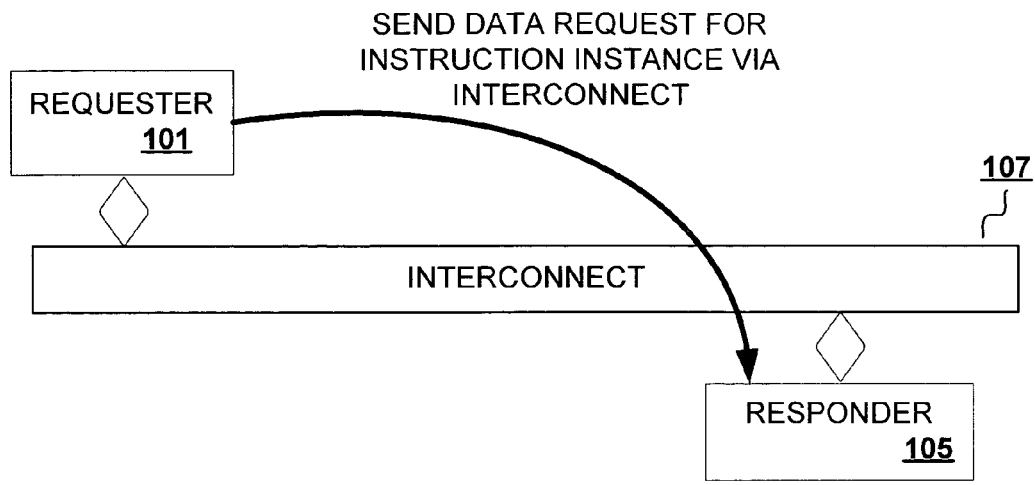
FIGS. 1A-1B depict exemplary interaction of system components for associating data source information with an instruction instance according to some realizations of the invention.
Figure 1B:
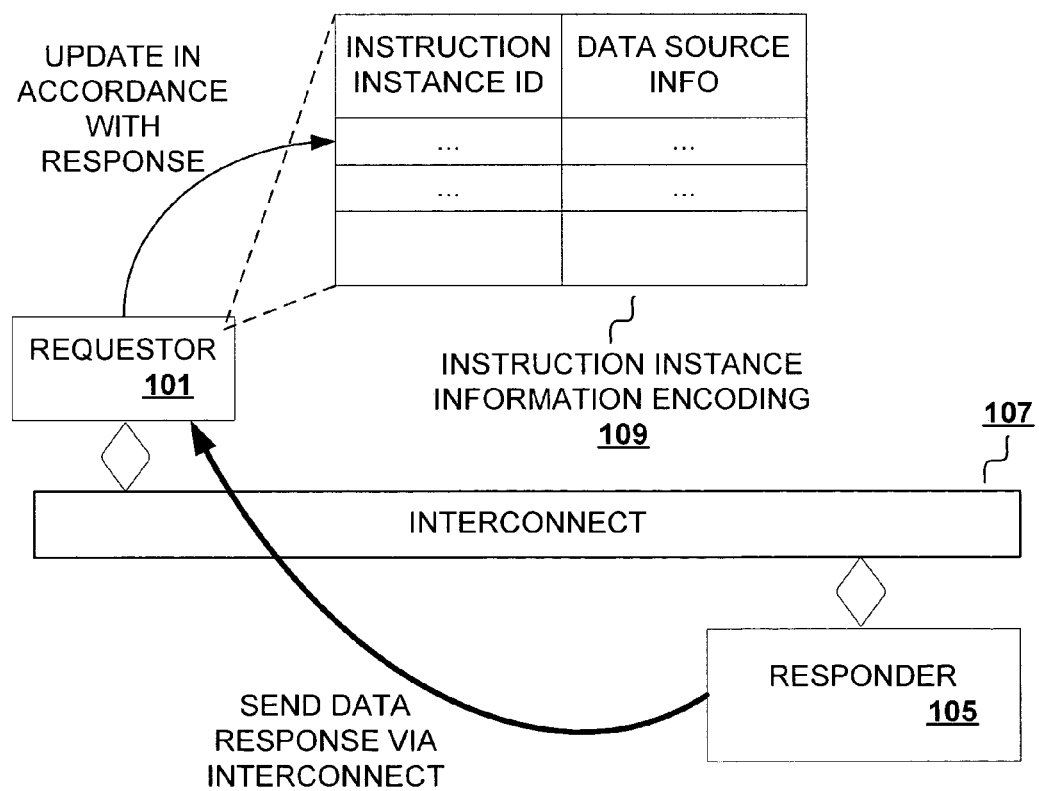

FIGS. 1A-1B depict exemplary interaction of system components for associating data source information with an instruction instance according to some realizations of the invention. FIG. 1A depicts an exemplary data request between system components according to some realizations of the invention. A requester 101 is coupled with an interconnect 107. A responder 105 is also coupled with the interconnect 107. The requester 101 and the responder 105 are any of various possible system components (e.g., processors, various types of memory, input/output bridges, etc.). The interconnect 107 may be implemented as any of a variety of buses, wires, pins, or any other circuit communication channel. The terms requester and responder correspond with initiation of communications (e.g., a component that sends a request) and do not restrict functionality of a system component (i.e., a component may be a requester for one transaction and a responder for another transaction). The requester 101 sends a request that corresponds to an instruction instance via the interconnect 107 to the responder 105.

FIG. 1B depicts exemplary interaction between system components and association of data source information with an instruction instance according to some realizations of the invention. In FIG. 1B, the responder 105 sends a response via the interconnect 107 to the requester 101. Although the interaction depicted in FIGS. 1A-1B is between system components coupled to the same interconnect, various realizations of the invention include systems of varying sizes with any number of processors and memories with multiple interconnects and intermediary components (e.g., address switches, data switches, bridges, etc.).

The requester 101 updates an instruction instance information encoding 109 in accordance with the received response. In FIG. 1B, the instruction instance information encoding 109 includes multiple entries. Each entry of the instruction instance information encoding 109 indicates an instruction instance identifier and its associated data source information (e.g., each entry is a vector of information). Various realizations of the invention indicate different information that corresponds to a data source (e.g., data source component identifying information, data source path information, etc.). In addition, various realizations of the invention also provide transactional information that corresponds to the request for data (e.g., atomicity of the transaction, whether the data is operand data or instruction data, whether the data is for a prefetch, identification of the strand and/or core that initiated the transaction, etc.). Providing data source information adds another perspective to performance monitoring or profiling. Providing transactional information also enhances profiling.

Additional information may be associated with the instruction instance identifiers and their data source information (e.g., addresses, data object indications, etc.). A more specific description of associating information with instruction instances can be found in commonly assigned, co-pending U.S. patent application Ser. Nos. 10/840,167, 10/840,164, and 10/840,180 respectively entitled "Method and Apparatus for Data Object Profiling," "Method and Apparatus for Profiling Data Addresses," and "Method and Apparatus for Correlating Profile Data," all filed on May 6, 2004, and all naming Nicolai Kosche, Brian J. Wylie, Christopher P. Aoki, and Martin S. Itzkowitz as inventors, which are incorporated herein by reference in their entirety. In addition, the instruction instance information encoding 109 can be implemented in software, hardware, or various combinations of hardware and software in various realizations of the invention (e.g., cache, registers, main memory, firmware, etc.). For example, the instruction instance information encoding 109 can be maintained in a history register with additional instruction instance information. A more detailed description of an exemplary history register is provided in U.S. patent application Ser. No. 10/113,357, entitled "Sampling Mechanism Including Instructions Filtering", filed on Apr. 1, 2002, naming Adam Talcott and Mario Wolczko as inventors.

Figure 2:
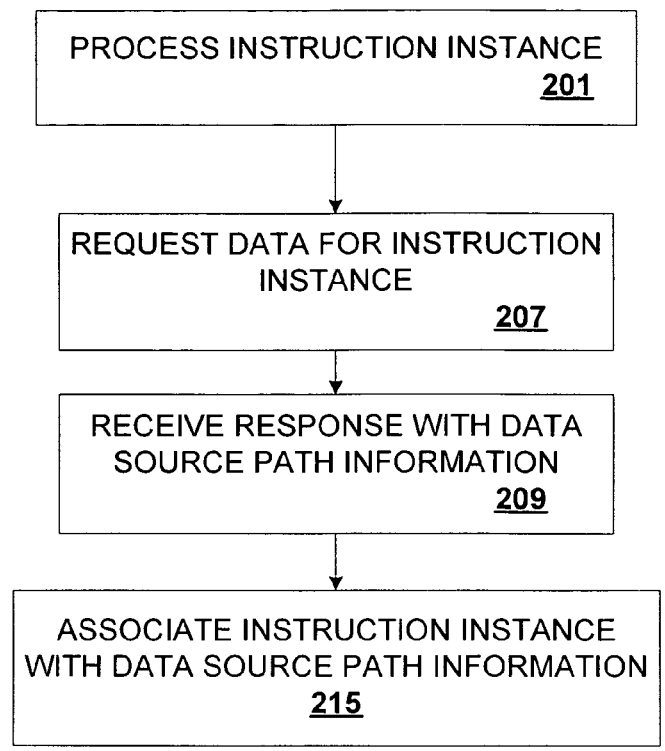
FIG. 2 depicts an exemplary technique for associating an instruction instance with data source information according to some realizations of the invention.

FIG. 2 depicts an exemplary technique for associating an instruction instance with data source information according to some realizations of the invention. At block 201, an instruction instance (e.g., an instance of a load instruction) is processed (e.g., fetched and decoded). At block 207, data corresponding to the instruction instance is requested (e.g., the source operand of a load instruction instance). At block 209, a response with data source information is received. At block 215, the data source information is associated with the instruction instance identifier.

Figure 3:
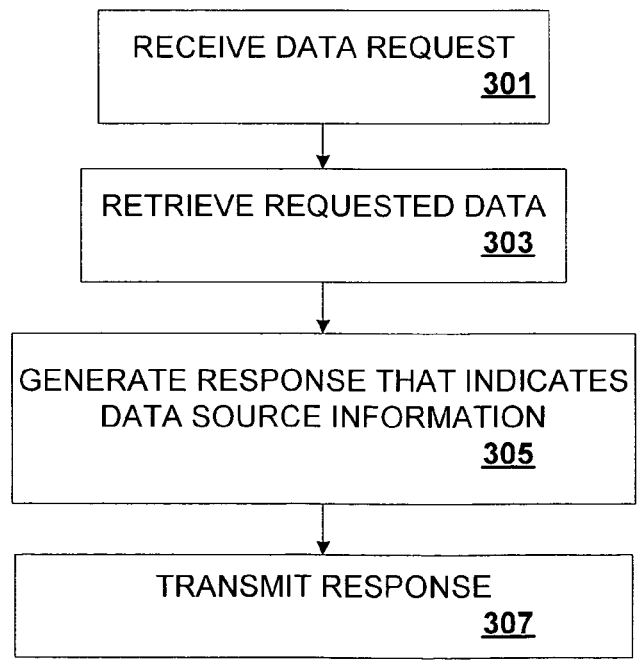
FIG. 3 depicts an exemplary technique for generating a response that indicates data source information according to some realizations of the invention.

FIG. 3 depicts an exemplary technique for generating a response that indicates data source information according to some realizations of the invention. At block 301, a request is received. At block 303, data that corresponds to the request is retrieved. At block 305, a response that indicates data source information is generated. At block 307, the response is transmitted.

Figure 4:
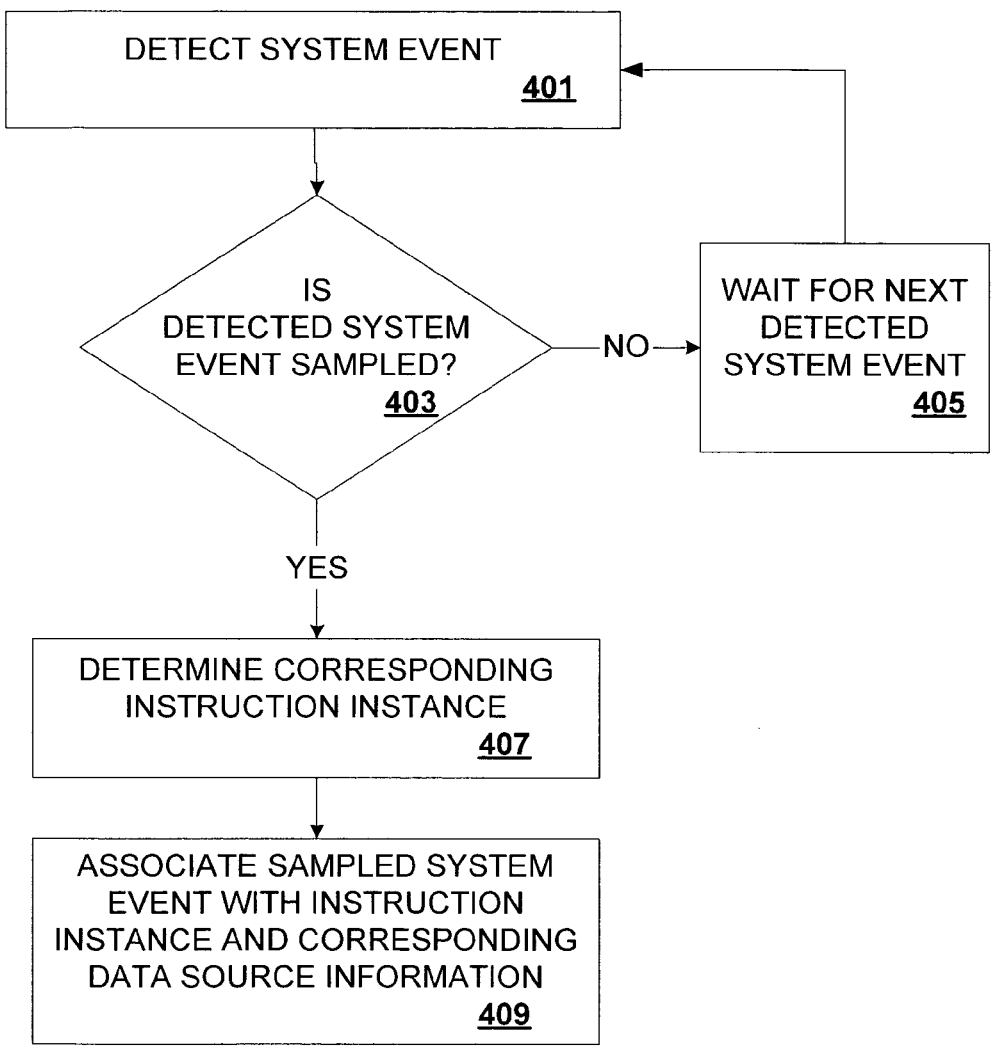
FIG. 4 depicts an exemplary technique for associating a runtime event with data source information according to some realizations of the invention.

FIG. 4 depicts an exemplary technique for associating a runtime event with data source information according to some realizations of the invention. At block 401, a runtime event is detected. At block 403, it is determined if the detected runtime event is sampled (e.g., a hardware counter reaches a threshold, a flag is set, etc.). If the detected runtime event is sampled, then control flows to block 407. If the detected runtime event is not sampled, then control flows to block 405.

At block 405, the system waits for the next runtime event. Control flows from block 405 to block 401.

At block 407, an instruction instance is determined as corresponding to the detected runtime event. At block 409, the sampled runtime event is associated with the corresponding instruction instance and the data source information associated with the instruction instance. For example, the information is associated in a runtime event vector that is stored in memory or storage, displayed, transmitted, etc.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.).

Figure 5:
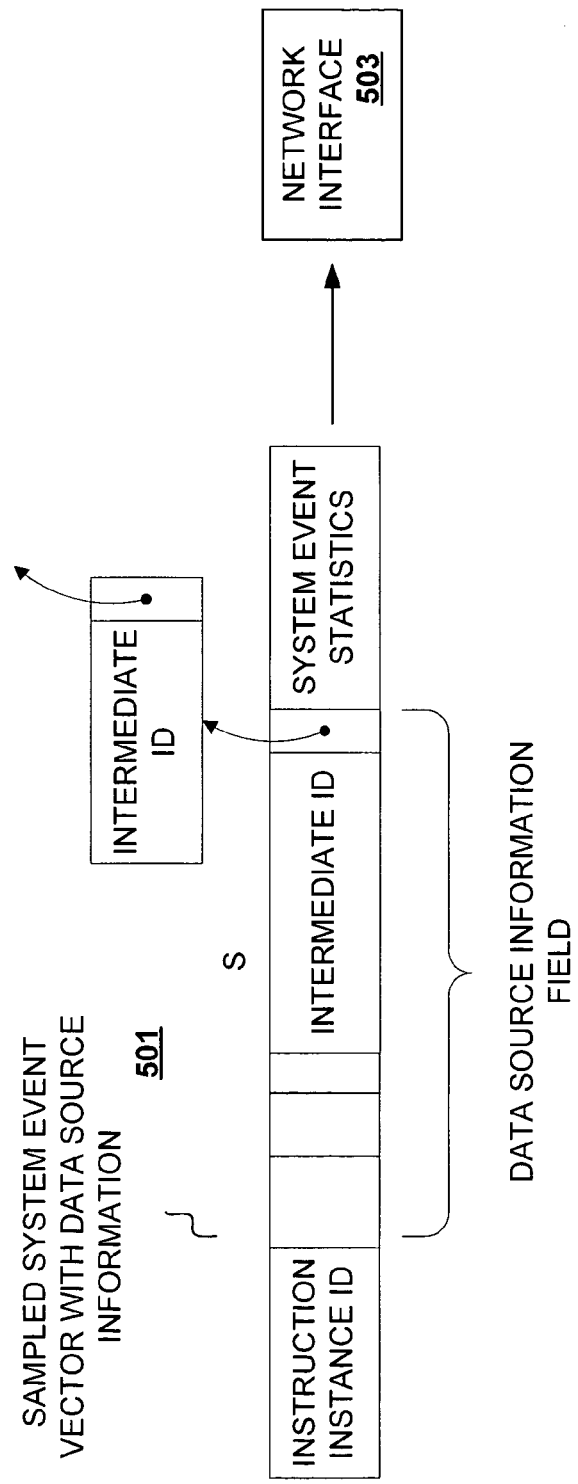
FIG. 5 depicts an exemplary runtime event vector according to some realizations of the invention.

FIG. 5 depicts an exemplary runtime event vector according to some realizations of the invention. In FIG. 5, a sampled runtime event vector 501 includes multiple fields. The sampled runtime event vector 501 includes an instruction instance identifier field (e.g., an instruction address, a rename identifier, etc.), a data source information field, and a runtime event statistics field. The fields of the runtime event vector 501 may include single values, may be simple data structures, may be complex data structures, etc. The data source information field of the runtime event vector 501 can include a variety of information (e.g., source component identifying indication, source component type indication, instruction instance type, request type, response type, intermediate component identifying indications, etc.). In FIG. 5, the data source information field is illustrated as including a linked list of intermediate component identifiers. The linked list may be a single element linked list or have numerous elements. The intermediate component identifiers identify intermediate components (e.g., data switches, address switches, I/O bridges, etc.) traversed by the response corresponding to the instruction instance while traveling from the responder component to the requester component. The runtime event vector 501 is transmitted via a network interface 503 in FIG. 5. The runtime event vector 501 is illustrated as being transmitted via the network interface 503, but the runtime event vector is not limited to being transmitted via a network interface. Various realizations of the invention dispose of runtime event vectors differently (e.g., store in local storage, maintain in system memory, store in a remote storage, analyze, dispose of individually, dispose of in batches, etc.).

Figure 6:
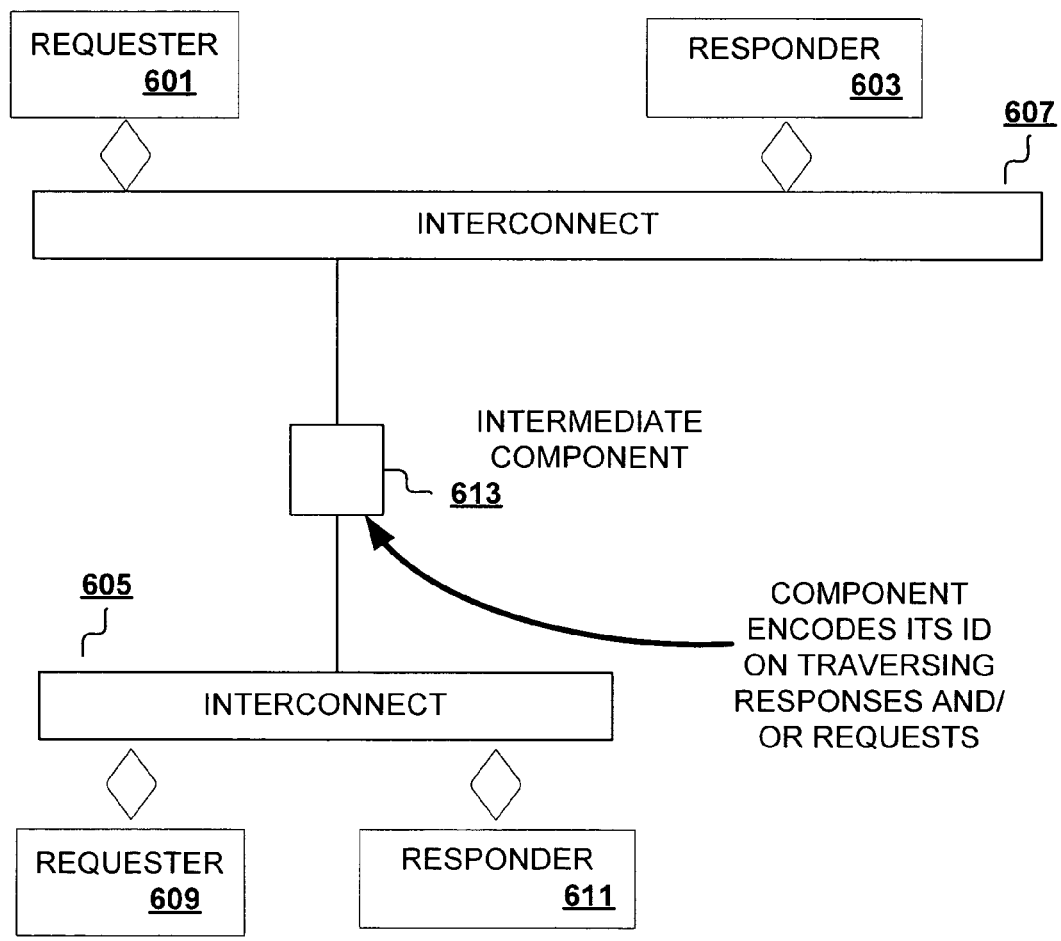
FIG. 6 depicts a system with an intermediate component according to some realizations of the invention.

FIG. 6 depicts a system with an intermediate component according to some realizations of the invention. A requester component 601 is coupled with an interconnect 607. A responder component 603 is also coupled with the interconnect 607. The interconnect 607 is coupled with an intermediate component 613. An interconnect 605 is also coupled with the intermediate component 613. The interconnect 605 is coupled with a requester component 609 and a responder component 611. When data is provided through the intermediate component 613, the intermediate component 613 encodes its identifier on data responses that traverse the intermediate component 613. Various realizations of the invention also encode intermediate component identifiers on traversing responses.

Including intermediate component identifying information provides another perspective to profiling. Identifying intermediate components allows remote and local operations to be distinguished and more precise identification of data paths that affect system performance.

Exemplary Systems

Figure 7:
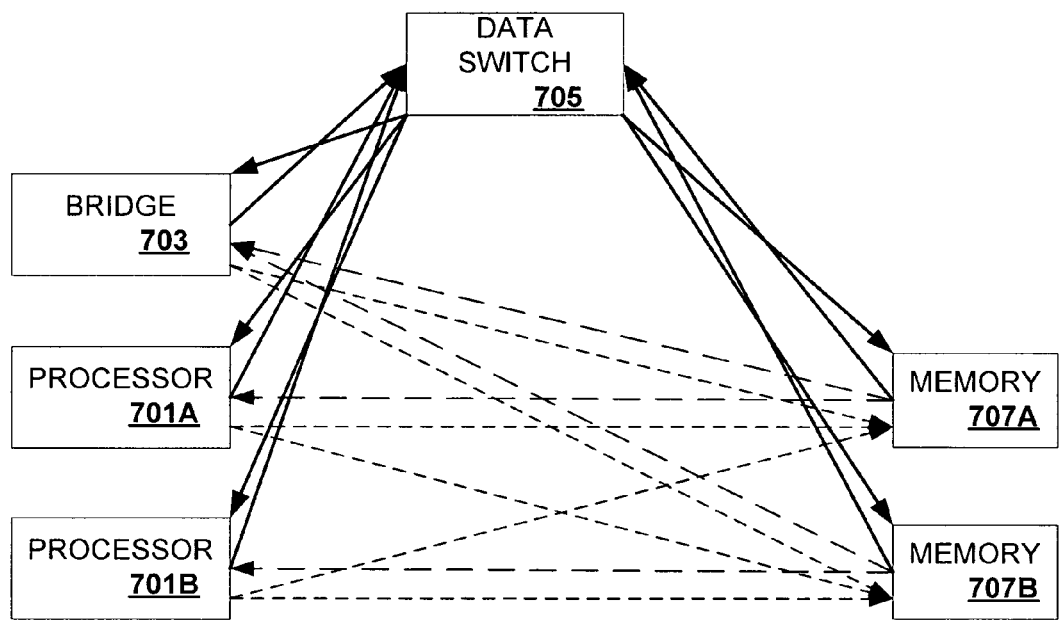
FIGS. 7-8 depict exemplary systems of different sizes according to some realizations of the invention.
Figure 8:
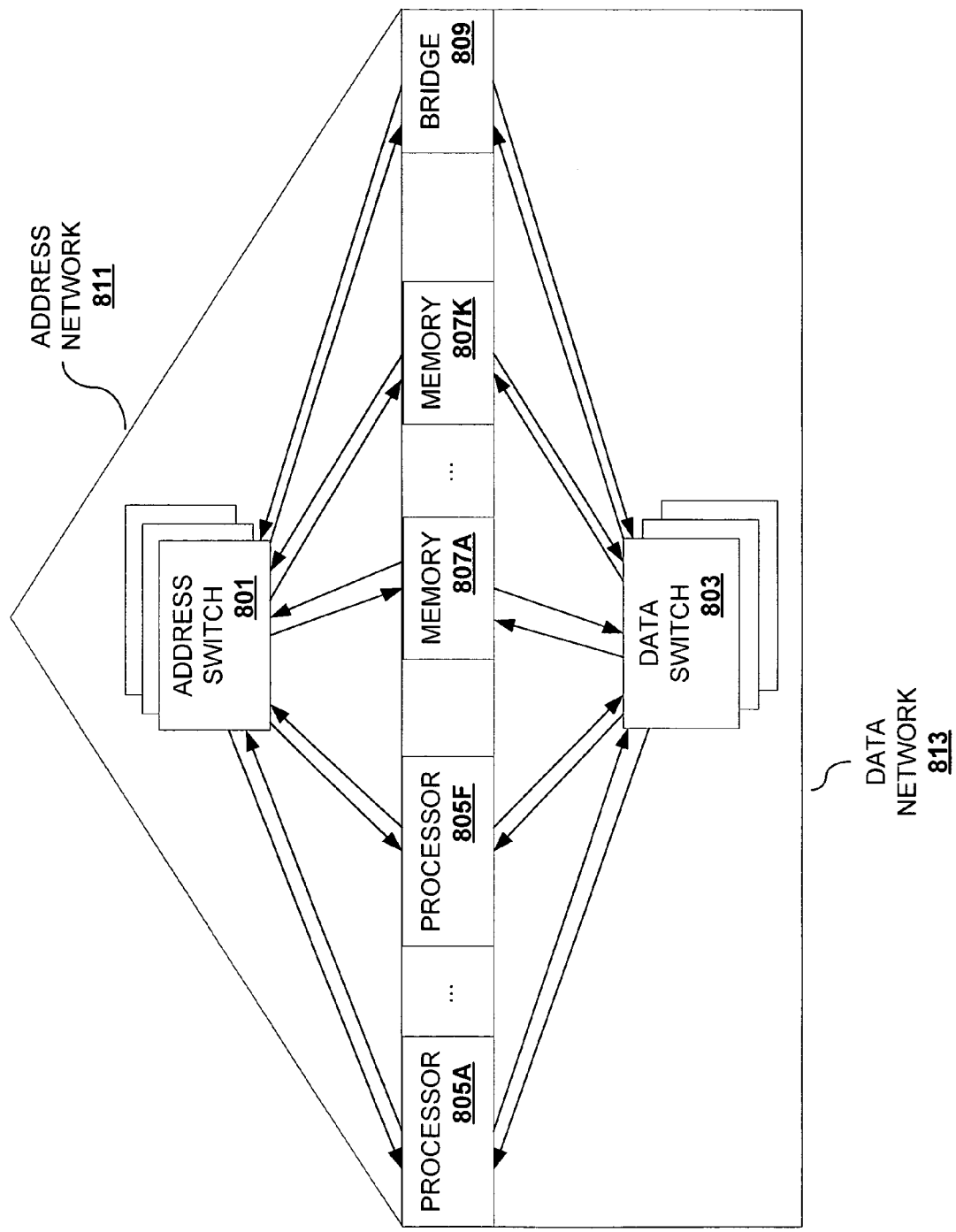

FIGS. 7-8 depict exemplary systems of different sizes according to some realizations of the invention. The exemplary systems are described in accordance with an exemplary data coherence protocol. The described invention is not limited to the particular exemplary protocol, but the systems are described with the example protocol to aid in understanding the described invention.

Packets (i.e., requests and responses) in the exemplary systems of FIGS. 7-8 comply with an exemplary data coherence protocol that classifies packets according to the network that will carry the packet. The exemplary multi-processor systems depicted in FIGS. 7-8 include an address network and a data network comprised of broadcast (BC) mode and point-to-point (PTP) mode interconnects, hence packets are classified as address packets or data packets. Each of the components (e.g., processor, memory, bridge, etc.) includes address network interfaces and data network interfaces. Various realizations of the invention include components that are packaged together and that share address network interfaces. The network address interfaces are physically source-synchronous, point-to-point, and unidirectional. The address network supports four virtual networks: 1) Broadcast; 2) Request; 3) Response; and 4) Multicast. The different virtual networks provide a logical mechanism to distinguish packets.

Virtual Networks in the Exemplary Systems

The broadcast virtual network implements a logical broadcast medium between components in a domain. It is only used for broadcast (BC) mode cache lines. When an address packet for a BC mode cache line is sent from a component, the broadcast virtual network delivers a copy of the address packet to every component in the given domain.

The request virtual network implements a logical point-to-point medium between the components. It is only used for point-to-point (PTP) mode cache lines. When an active device (i.e., a system component that is not memory) sends an address packet for a PTP mode cache, the request virtual network delivers the packet to the memory component (if a cacheable address) or the I/O component (if a noncacheable address) that maps the given line.

The response virtual network implements a logical point-to-point medium between the components. It is used for PTP cache lines. When a memory device receives an address packet from the request network for a cacheable PTP mode cache line, it responds by sending packets on the response, multicast, and/or data networks. The packets sent on the response virtual network implement requests for data transfers and changes of ownership. They are sent to the requesting and/or owning components.

The multicast virtual network implements a logical point-to-multipoint medium between the components in a domain. It is used for PTP mode cache lines. When a memory component receives an address packet from the request virtual network for a cacheable PTP mode cache line, it responds by sending packets on the response, multicast, and/or data networks. The packets sent on the multicast virtual network implement changes of access rights. They are sent to the requesting component and at least to all non-owning sharers.

Packet Types in the Exemplary Systems

Requests and responses in this exemplary system can be either address or data packets. Table 1 indicates different types of address packets.

TABLE 1

Types of Address Packets

| Packet Type | Full Name | Sender | Virtual Networks | Address Space Cacheable | I/O | Interrupt | Description |
|---|---|---|---|---|---|---|---|
| RTS | ReadToShare | Active Device | Broadcast, Request, Response | Y | | | Requests read-only copy of cache line |
| RTO | ReadToOwn | Active Device | Broadcast, Request, Response | Y | | | Requests writable copy of cache line |
| RTWB(1) | ReadToWriteBack | Active Device | Broadcast, Request, Response | Y | | | Request to receive writable copy of cache line and send cache line to memory |
| RS | ReadStream | Active Device | Broadcast, Request, Response | Y | | | Request read-once copy of cache line |
| MRM (2) | MemoryDeMap | Memory | Broadcast | Y | | | Request to change mapping of cache line from one memory to another |
| MDM (3) | WriteStream | Memory | Broadcast | Y | | | Request to demap memory location |
| WS | WriteBack | Active Device | Broadcast, Request, Response | Y | | | Request to write entire cache line and send to memory |
| WB | WriteBackShared | Active Device | Broadcast, Request, Response | Y | | | Request to send cache line from owning device to memory, device does not keep copy |
| WBS | Invalidate | Active Device | Broadcast, Request, Response | Y | | | Request to send cache line from owning device to memory, device keeps read-only copy |
| WAIT | ReadIO | Memory | Response | Y | | | Response from memory to requester in point-to-point mode indicating that requester must wait for an INV |
| INV | WriteIO | Memory | Multicast | Y | | | Response from memory to requester and sharers in point-to-point mode invalidating shared copies |
| RIO | Interrupt | Active Device | Broadcast, Request | | Y | | Request to read IO locations within aligned 64B region |
| WIO | MemoryDeMap | Active Device | Broadcast, Request | | Y | | Request to write IO locations within aligned 64B region |

TABLE 1-continued

Types of Address Packets

| Packet Type | Full Name | Sender | Virtual Networks | Address Space | | | Description |
|---|---|---|---|---|---|---|---|
| | | | | Cacheable | I/O | Interrupt | |
| INT | WriteStream | Active Device | Broadcast | | | Y | Sends an interrupt, target is specified by address |

The RTWB transaction allows bridges (and other active devices) to perform a write to part of a cache line without gaining ownership of the cache line and responding to foreign requests for the cache line. The MRM transaction allows memory components to remap cache lines from one memory component to another. In addition, it moves ownership of a cache line to the initiator of the MRM transaction. The MRM transaction is used for BC mode cache lines. The MDM transaction allows a memory controller to demap cache lines while simultaneously ensuring that the line is invalid in all caches. After the MDM transaction is broadcast, any subsequent transaction to that cache line will receive a response from an error server. The MDM transaction is used for BC mode cache lines. The MDM transaction does not affect memory management unit address translation tables.

In this exemplary system, address packets sent from system components are preceded by routing prefixes. The routing prefixes provide routing information such as whether a non-NULL address packet follows the routing prefix, the virtual network of the address packet, destination information, flow control information, and freeze information. If a routing prefix is a NULL prefix, no packet follows the routing prefix (rather, another routing prefix immediately follows the NULL prefix). Routing prefixes are not sent from switch components to non-switch components, thus allowing an increase in available bandwidth, since the routing information is not required in this case. Routing prefixes, are also not sent from memory components to active devices in switchless address networks, such as the system illustrated in FIG. 7.

When routing prefixes are used, identical routing prefixes are sent on multiple slices of the address network for various mechanisms, such as redundancy and error correction.

In systems with switch-based address networks, such as the exemplary system illustrated in FIG. 8, address packets span multiple slices of the address network. For example, if the address network includes 5 slices, then slices 0 through 3 contain the packet body and an error detecting and/or correcting code. Slice 4 contains the XOR of slices 0 through 3. In systems with switchless address networks with 5 slices, identical complete address packets are sent on each of 4 slices from the initiating active devices to the memory components and from the memory components to initiating active components.

In the described exemplary system, various parts of an address packet are defined as a null indicator, address packet body, diagonal check bits, slice check bits, and parity bits. The address packet body includes fields that indicate the physical destination address of the address packet, initiating component identifier, address packet identifier, and a command field that indicates transaction type information. This transaction type information indicates the following: 1) whether the transaction was initiated for a data load or for an instruction fetch; 2) whether the transaction was initiated for an atomic or non-atomic access; 3) whether the transaction was initiated for a prefetch; and 4) identity of the strand and/or core that initiated the transaction.

Table 2 shown below indicates different types of data packets.

TABLE 2

Types of Data Packets

| Packet Type | Full Name | Sender | Receiver | Description |
|---|---|---|---|---|
| PRN | PullRequest | Active Device, Memory or Noncacheable/ Interrupt Target | Active Device | Requests writable copy of cache line |
| PRACK | PullRequestAck | Memory | Active Device | Request to receive writable copy of cache line and send cache line to memory |
| DATA | Data- | Active Device, Memory or Noncacheable Target | Active Device, Memory or Noncacheable/ Interrupt Target | Request read-once copy of cache line |
| DATAP | Data-Pull | Memory | Active Device | Request to change mapping of cache line from one memory to another |
| ERRL | Error-Long | Error Server | Active Device or Memory | Request to demap memory location |
| ACK | Ack | Active Device | Active Device | Request to write entire cache line and send to memory |

TABLE 2-continued

Types of Data Packets

| Packet Type | Full Name | Sender | Receiver | Description |
|---|---|---|---|---|
| NACK | Negative Ack | Interrupt Target or Active Device | Active Device or Memory | Request to send cache line from owning device to memory, device does not keep copy |
| ERR | Error | Error Server | Active Device | Request to send cache line from owning device to memory, device keeps read-only copy |

Data packets in the exemplary system are either short data packets or long data packets, depending on the data being provided. Regardless of the size of data, data packets indicate the following: 1) packet identifier either assigned by the destination of the data, the source of the data, or both a data source packet identifier and a data destination packet identifier; 2) data source component; and 3) data source component type. Data packets may also indicate error checking and/or error correction, data packet type, data validity, etc.

FIG. 7 depicts a small multi-processor system according to some realizations of the invention. Processors 701A-701B are coupled to memories 707A-707B with synchronous unidirectional interconnects, as discussed above. Although various realizations of the invention are not limited to unidirectional synchronous interconnects, illustration of specific interconnects in FIGS. 7-8 is meant to aid in understanding the invention and not meant to limit the invention. The memory 707A is coupled to the processor 701A and to a bridge 703 (e.g., an input/output bridge) with interconnects. The memory 707B is coupled to the bridge 703 and the processor 701B with interconnects. A data switch is coupled to the processors 701A-701B, the bridge 703, and the memories 707A-707B with interconnects, and from these components with interconnects as well.

In order to illustrate operation of the exemplary system, a transaction in FIG. 7 is described in accordance with the above exemplary protocol. Assume that processor 701A initiates a transaction with the memory 707B. The processor 701A generates an RTS address packet for an instruction instance (e.g., a read instruction instance being executed by the processor 701A). The processor 701A indicates in the address packet that the transaction is an atomic access for a data load that is not a prefetch. The processor 701A also identifies a strand that initiated the transaction. The processor 701A may also indicate the transaction information in its instruction instance information encoding. The processor 701A indicates its identity in the address packet and sends the address packet over an interconnect to the memory 707B. The memory 707B retrieves the data and generates a data packet to provide the data to the processor 701A. The memory 707B indicates its identity in the data packet as well as indicating that the data source is a memory component. The memory 707B sends the data, which traverses the data switch 705, to the processor 701A. The processor 701A extracts the identifier of the memory component 707B and updates the instruction instance information encoding accordingly. The processor 701A may also extract the component type information. In addition, the data switch 705 may indicate itself in the data packet that traverses the data switch 705.

FIG. 8 depicts an exemplary large system according to some realizations of the invention. In FIG. 8, an address network 811 includes an address switch 801 and interconnects to and from processors 805A-805F, to and from memories 807A-807K, and to and from a bridge 809. A data network 813 includes data switch 803 and interconnects to and from the processors 805A-805F, to and from the memories 807A-807K, and to and from the bridge 809. A transaction in accordance with the exemplary above protocol and packet definitions in the exemplary system of FIG. 8 is similar to the transaction described with reference to FIG. 7.

Assume the processor 805D initiates a transaction with the memory 807B. The processor 805D generates an address prefix and sends it to the address switch 801. The address prefix provides routing information (e.g., destination component identifier, physical address, UMA segment identifier, etc.) to the address switch 801 that corresponds to an address packet that will follow the address prefix. The processor 805D generates an RTO address packet for transmission to the memory 807B. The processor 805D indicates in the address packet that the transaction is an atomic access for a data load that is not a prefetch. The processor 805D also identifies a strand that initiated the transaction. The processor 805D may also indicate the transaction information in its instruction instance information encoding. The processor 805D indicates its identity in the address packet and sends the address packet over an interconnect to the address switch 801. The address switch 801 routes the address packet based on the previously received address prefix to the memory 807B.

The memory 807B retrieves the requested data and generates a data packet (i.e., response) to provide the requested data to the processor 805D. The memory 807B indicates its identity in the data packet as well as indicating that the data source is a memory component. The memory 807B sends the data, which traverses the data switch 803, to the processor 805D. The processor 805D extracts the identifier of the memory component 807B and updates the instruction instance information encoding accordingly. The processor 805D may also extract the component type information. In addition, the data switch 803 can indicate itself as an intermediate component in the data packet.

The transactions described with FIGS. 7 and 8 are meant to illustrate the invention and not meant to limit the invention. As previously stated, systems of varying size can implement the invention and various system components traversed by data can indicate their identity, thus describing the data source path in greater detail.

The described invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 9:
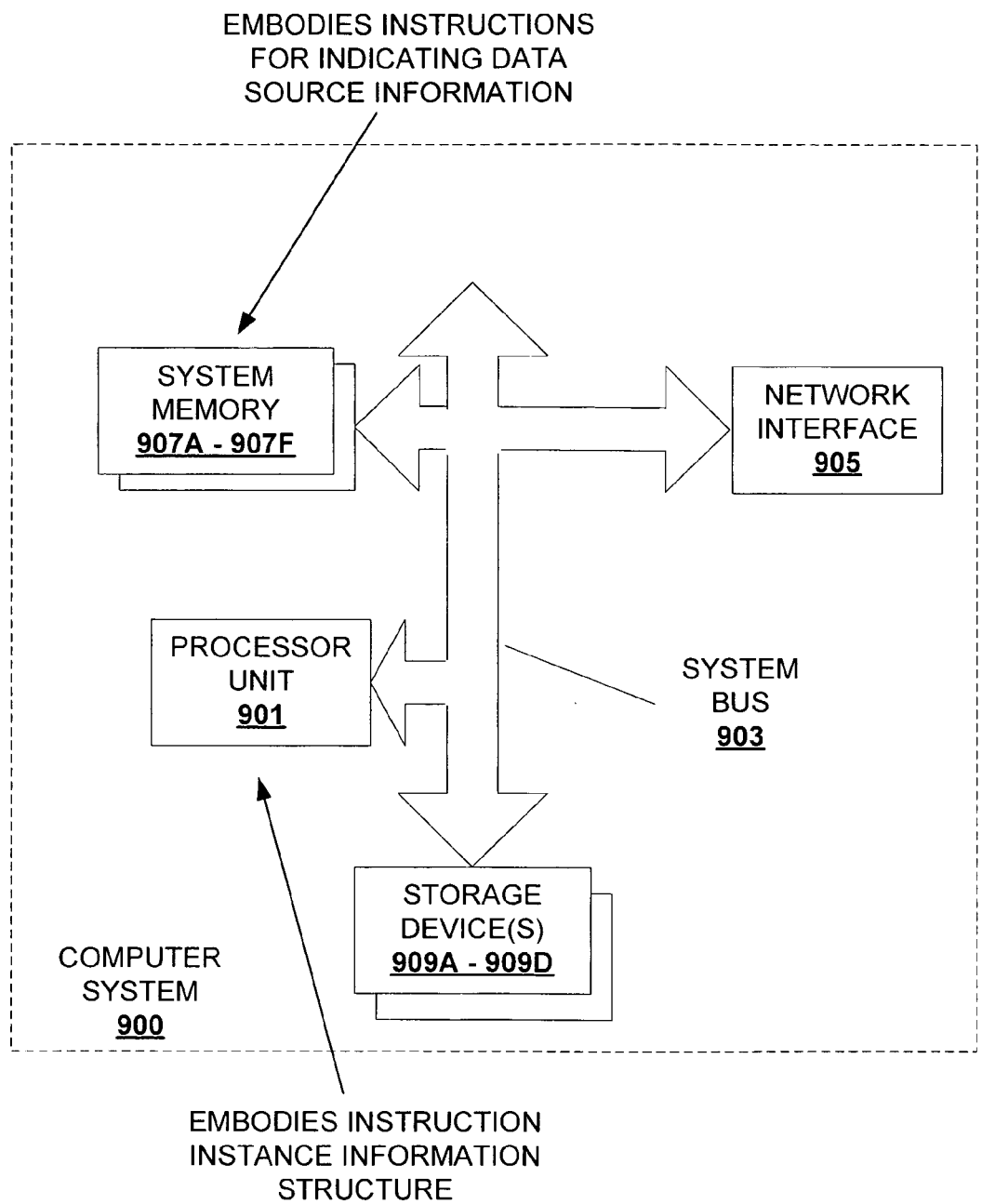
FIG. 9 depicts an exemplary computer system according to some realizations of the invention.

FIG. 9 depicts an exemplary computer system according to some realizations of the invention. A computer system 900 includes a processor unit 901 (possibly including multiple processors). The processor unit 901 (including software executable thereon) embodies an instruction instance information encoding with data source information associated with runtime events. The computer system 900 also includes a system memory 907A-907F (e.g., one or more of cache, SRAM DRAM, RDRAM, EDO RAM, DDR RAM, EEPROM, etc.). The system memory 907A-907F embodies instructions for indicating data source information. Various realizations of the invention embody instructions for indicating data source information and for associating data source information with runtime events differently (e.g., different machine-readable media, different modularization of functionality, etc.). The system 900 also includes a system bus 903 (e.g., LDT, PCI, ISA, etc.), a network interface 905 (e.g., an ATM interface, an Ethernet interface, a Frame Relay interface, etc.), and a storage device(s) 909A-909D (e.g., optical storage, magnetic storage, etc.). Realizations of the invention may include fewer or additional components not illustrated in FIG. 9 (e.g., video cards, audio cards, additional network interfaces, peripheral devices, etc.). The processor unit 901, the storage device(s) 909A-909D, the network interface 905, and the system memory 907A-907F are coupled to the system bus 903.

Figure 10:
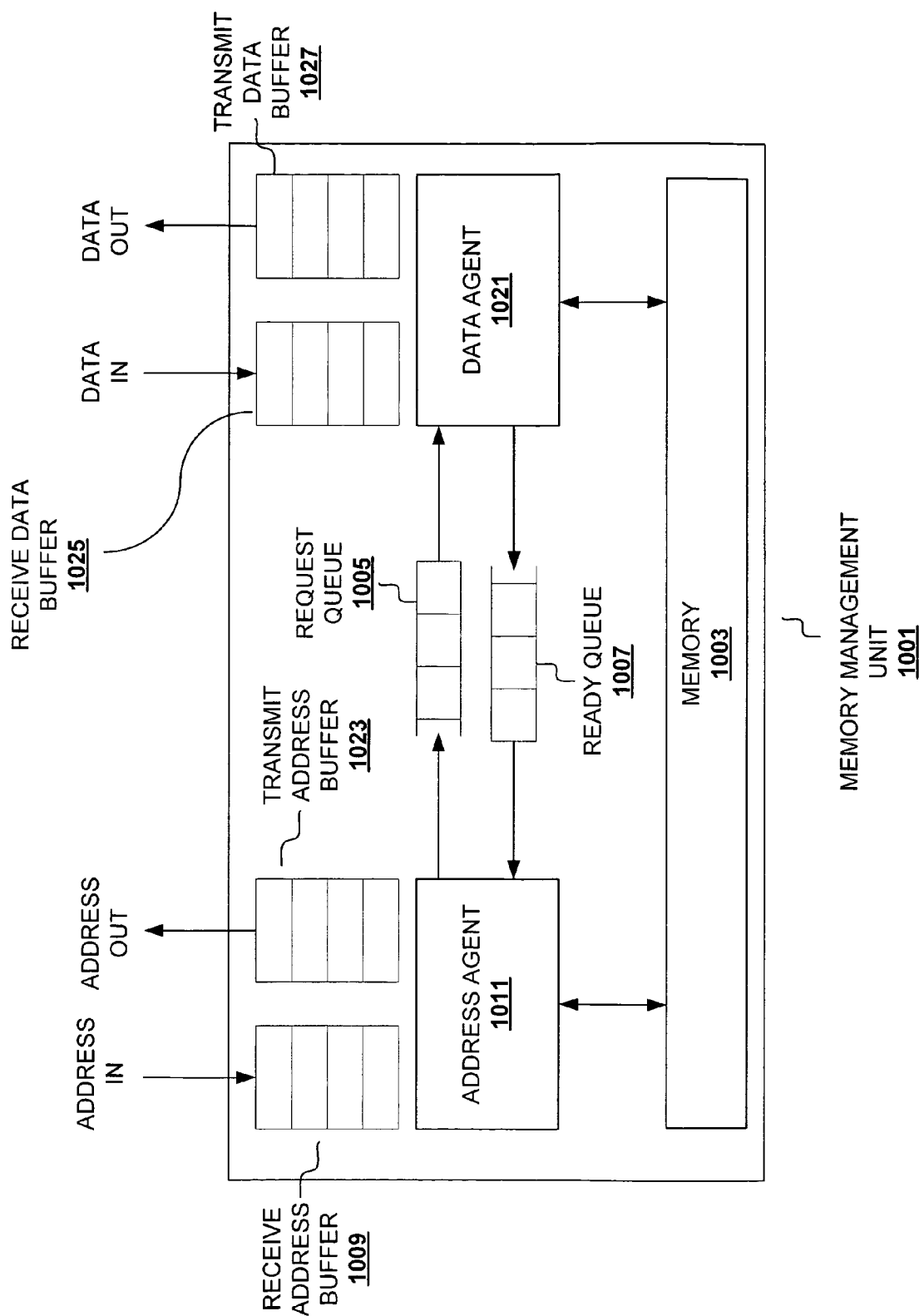
FIG. 10 depicts an exemplary memory according to some realizations of the invention. The memory illustrated in FIG. 10 is an example of an implementation of memory in the systems illustrated in FIGS. 7-9.

FIG. 10 depicts an exemplary memory according to some realizations of the invention. The memory illustrated in FIG. 10 is an example of an implementation of memory in the systems illustrated in FIGS. 7-9. FIG. 10 illustrates a memory management unit 1001 that includes memory 1003, receive address buffer 1009, transmit address buffer 1023, receive data buffer 1025, and transmit data buffer 1027. The memory management unit 1001 is also illustrated in FIG. 10 as including an address agent 1011 and a data agent 1021. Various realizations of the invention implement the address agent 1011 and the data agent 1021 differently (e.g., instructions encoded in the memory management unit 1001, processes stored external to the memory manage unit 1001 but executing on the memory management unit 1001, instructions loaded into the memory management unit 1001 and executed, etc.).

The memory management unit 1001 receives address packets into the receive address buffer 1009 and transmits address packets from the transmit address buffer 1023. The address agent 1011 retrieves address packets from the receive address buffer 1009 and processes the address packets. If an address packet requests data (e.g., instruction data, operand data, etc.), then the address agent 1011 updates a request queue 1005 to indicate the requested data. In addition, the address agent 1011 retrieves indications from a ready queue 1007, which indicates to the address agent 1011 that the data agent 1021 has prepared data for sending. When the address agent 1021 has prepared an address packet for transmission, the address agent 1021 places the address packet in the transmit address buffer 1023.

The data agent 1021 retrieves data (e.g., to write the data to the memory 1003) from the receive data buffer 1025. The data agent 1021 places data packets ready for transmission (e.g., data retrieved from the memory 1003 for transmission to a processor, cache, another memory, etc.) into the transmit data buffer 1027. The data agent 1021 prepares data packets for request indications retrieved from the request queue 1005. When the data agent 1021 has prepared a data packet ready for transmission, the data agent 1021 updates the ready queue 1007.

An example operation of the memory management unit 1001 will be described to aid in understanding the invention, but the example operation is not meant to be limiting upon the invention. Assume the address agent 1011 processes an address packet from the receive address buffer 1009. The address packet requests data from the memory 1003. The address agent 1011 places an indication of the request in the request queue 1005. The data agent 1021 retrieves the request indication, retrieves the requested data from memory 1003, and generates a data packet in accordance with the request. In generating the data packet, the data agent 1021 indicates an identifier for the memory management unit 1001. The data agent 1021 then places the data packet in the transmit data buffer 1027 for transmission.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computing system that includes a processor and that supplies the processor with a source indication for an instruction instance executed by the processor, wherein the instruction instance requests data from a first piece of hardware that is external to the processor, wherein the instruction instance is associated with a runtime event, wherein the processor supplies an encoding of the runtime event associated with the source indication for profiling of code, and wherein the source indication represents a cumulative path from the first piece of hardware, through a second piece of hardware, to the processor.

2. The system of claim 1 wherein the processor associates the source indication with its respective instruction instance, detects the runtime event, and associates the detected runtime event with an instruction instance corresponding thereto.

3. The system of claim 1 wherein the source indication includes one or more of component identifiers, interconnects, and ports.

4. The system of claim 3 wherein component identifiers include values that identify one or more of processors, memories, bridges, and switches.

5. The system of claim 1 wherein said supplying of the source indication comprises:

the processor sending a request for data to a system component; the system component, generating a response that includes the data and an indication of the system component; and sending the response to the processor.

6. The system of claim 1 wherein the processor also associates transactional information with runtime events, wherein the transactional information describes characteristics of data requests that correspond to instruction instances.

7. The system of claim 6 wherein the data request characteristics include requested data type, atomic characteristic, prefetch characteristic, strand identifier, and core identifier.

8. A method comprising:
associating a source indication with an instruction instance, being executed by a processor, wherein the instruction instance requests data from a first piece of hardware that is external to the processor, wherein the source indication represents a cumulative path from the first piece of hardware, through a second piece of hardware, to the processor;
determining that the instruction instance corresponds to a runtime event; and
associating the source indication with the runtime event for profiling of code.

9. The method of claim 8 further comprising indicating the source indication in an encoding that indicates instruction instance information.

10. The method of claim 9 wherein the encoding also indicates runtime event information.

11. The method of claim 8, wherein the runtime event includes a sampled runtime event.

12. The method of claim 8 further comprising receiving the source indication from a piece of hardware that is external to the processor.

13. The method of claim 12 wherein the piece of hardware that is external to the processor includes a processor, a memory, a bridge, and a switch.

14. The method of claim 8 wherein the source indication includes one or more of component identifiers, interconnects, and ports.

15. The method of claim 8 wherein associating the source indication with the instruction instance includes updating a data structure that indicates the instruction instance indicates the source indication.

16. The method of claim 8 further comprising generating a data structure that at least indicates the runtime event, runtime events statistics, and the source indication.

17. The method of claim 8 embodied in a computer program product encoded on one or more machine-readable storage media.

18. A method comprising:
encoding data source identifying information for profiling a instruction instance executed on a computer system comprising a processor, wherein the identifying information indicates a path taken by data requested by the processor, wherein the data source identifying information indicates a cumulative path of the data requested by the processor from a first piece of hardware that is external to the processor, through a second piece of hardware that is external to the processor, to the processor; and
associating the data source identifying information with a runtime event that corresponds to the instruction instance.

19. The method of claim 18 wherein encoding data source identifying information includes the first piece of hardware setting one or more values in a data packet to indicate the first piece of hardware is the source of the provided data.

20. The method of claim 18 wherein the first piece of hardware includes a bridge, a switch, a memory, a cache, or a processor.

21. The method of claim 18 wherein data source information includes one or more of component identifying indications, data path indications, and interconnect indications.

22. The method of claim 18 further comprising associating transactional information with the runtime event, wherein the transactional information indicates characteristics of the data request.

23. The method of claim 22 wherein the transactional information indicates one or more of whether the requested data is operand or instruction data, whether the data request is atomic, whether the data request corresponds to a prefetch, identifier of a strand that initiated the data request, and identifier of the core that initiated the data request.

24. The method of claim 18 further comprising:
detecting the runtime event;
determining whether the runtime event is to be sampled; and
if the runtime event is to be sampled, then determining that the instruction instance corresponds to the detected runtime event.

25. The method of claim 18 embodied in a computer program product encoded on one or more machine-readable storage media.

26. A method comprising:
receiving a data request from a first piece of hardware for an instruction instance executed by a processor;
encoding indicators of a second piece of hardware and a third piece of hardware in a data response that provides the requested data to the requesting first niece of hardware; and
providing the data response to the first piece of hardware, wherein the indicators represent a cumulative path from the first piece of hardware, through the second piece of hardware, through the third piece of hardware, to the processor wherein the second and third pieces of hardware are external to the processor, wherein the indicators are associated with a runtime event of the processor that corresponds to the instruction instance for profiling code.

27. The method of claim 26 wherein encoding the indicator of the second piece of hardware includes setting one or more bits in the data response to identify the second piece of hardware.

28. The method of claim 26 wherein the first, second, and third pieces of hardware includes a processor, a memory, a cache, a switch, or a bridge.

29. The method of claim 26 further comprising encoding a fourth piece of hardware's indicator in the data response, wherein the fourth piece of hardware's indicator is cumulatively supplied along with other the indicators associated with the other pieces of hardware.

30. The method of claim 29 wherein the fourth piece of hardware's indicator includes an intermediate system piece of hardware in the data source path between the first and second pieces of hardware.

31. The method of claim 26 embodied in a computer program product encoded on one or more machine-readable storage media.

32. A method comprising:
requesting data for an instruction instance executed by a processor;
receiving the requested data and data source information wherein the source information represents a cumulative path taken by data requested by the processor from a first piece of hardware that is external to the processor, through a second piece of hardware that is external to the processor, to the processor; and associating the received data source information with a sampled runtime event that corresponds to the instruction instance so as to generate a profile of code that indicates which instruction instances and data sources give rise to runtime events.

33. The method of claim 32 further comprising associating the data source information with the instruction instance.

34. The method of claim 33 further comprising maintaining an encoding that indicates the associated data source information, the instruction instance, and the sampled runtime event.

35. The method of claim 32 further comprising associating transactional information with the runtime event, wherein the transactional information indicates characteristics of the data request.

36. The method of claim 35 wherein the transactional information indicates one or more of whether the requested data is operand or instruction data, whether the data request is atomic, whether the data request corresponds to a prefetch, identifier of a strand the initiated the data request, and identifier of the core that initiated the data request.

37. The method of claim 32 wherein the requested data and the data source information is received as a data packet, and decoding the data packet to determine the data source information.

38. The method of claim 32 further comprising:
detecting the runtime event; and
determining that the runtime event corresponds to the instruction instance.

39. The method of claim 32 embodied in a computer program product encoded on one or more machine-readable storage media.

40. An apparatus having a processor, the apparatus comprising:
a data store comprising a first piece of hardware that is external to the processor and a second piece of hardware that is external to the processor; and
means for associating a sampled runtime event with data source information that corresponds to an instruction instance, which relates to the sampled runtime event wherein the instruction instance is executed by a processor to request data from the first piece of hardware and the data source information represents a cumulative path from the first piece of hardware, through the second piece of hardware, to the processor;
wherein the means for associating a sampled runtime event with data source information further comprises means for generating profiled code indicating which instruction instances and data sources give rise to runtime events.

41. The apparatus of claim 40 further comprising means for associating transactional information that describes a data request for data corresponding to the data source information.

42. The apparatus of claim 41 wherein the transactional information indicates one or more of whether the requested data is operand or instruction data, whether the data request is atomic, whether the data request corresponds to a prefetch, identifier of a strand that initiated the data request, and identifier of the core that initiated the data request.

43. The apparatus of claim 40 wherein data source information includes component identifying indications and interconnect information.

44. A system comprising:
an interconnect coupling a processor to a memory unit; and
the memory unit including one or more data stores and logic that causes the memory unit to supply source information to the processor in response to execution by the processor of an instruction instance that requests data from first of the one or more data stores, wherein the source information represents a cumulative hardware path from the first data store, through an additional data store, to the processor, and wherein the source information is associated with a runtime event that corresponds to the instruction instance to profile code.

45. The system of claim 44 wherein the memory also includes, an address agent to process and to generate address packets;
a data agent to process and to generate data packets, and to indicate the data source information in the data packets.

46. The system of claim 45 further comprising the address agent to notify the data agent of data requests.

47. The system of claim 44 further comprising:
an address packet receive buffer;
an address packet transmit buffer;
a data packet receive buffer;
a data packet transmit buffer;
a data request queue to store indications of data requests; and
a data ready queue to store indications that data is ready for storage or transmission.

48. A computing system that includes a processor and plural data sources external to the processor and accessible to the processor, at least a first of the plural data sources accessible via an interconnect, wherein, in response to execution by the processor of an instruction instance that requests data from the first data source and results in a runtime event, the processor receives an encoding of the runtime event and an encoding of an identifier indicative of the first data source as well as receives a second encoding representative of a cumulative hardware path from the first of the plural data sources, through an additional data source, to the processor.

49. The computing system of claim 48, wherein the plural data sources includes one or more of caches, another processor, and main system memory.

50. The computing system of claim 48, wherein the interconnect includes a bus, a wire, or a switch.

51. The computing system of claim 48, wherein the instruction instance includes an instance of a load instruction or an instance of a store instruction.

52. The computing system of claim 48 further comprising an additional interconnect interposed between the processor and the first data source, wherein the identifier identifies both the interconnect and the additional interconnect.

53. A computer program product encoded in one or more machine-readable storage media, the computer program product comprising:
a first sequence of instructions for providing data response packets encoded with data source information; and
a second sequence of instructions for associating the data source information with runtime events wherein the first and second sequences are executed by a processor and the data source information represents a cumulative path taken by data requested by the processor from a first piece of hardware that is external to the processor, through a second piece of hardware that is external to the processor, to the processor and wherein executing the sequences yields a profile of code that indicates which instructions and pieces of hardware give rise to the runtime events.

54. The computer program product of claim 53 wherein associating the data source information with runtime events comprises updating a data structure that includes fields for runtime events and data source information.

55. The computer program product of claim 53 wherein associating the data source information comprises associating the data source information to corresponding instruction instances and associating runtime events to corresponding instruction instances.

56. The computer program product of claim 55 further comprising a third sequence of instructions to detect the runtime events and to determine correspondence between the runtime events and the instruction instances.

* * * * *

UNITED STATES PATENT AND TRADEMARK OFFICE
CERTIFICATE OF CORRECTION

| | | |
|---|---|---|
| PATENT NO. | : 7,707,554 B1 | Page 1 of 1 |
| APPLICATION NO. | : 10/880485 | |
| DATED | : April 27, 2010 | |
| INVENTOR(S) | : Nicolai Kosche et al. | |

It is certified that error appears in the above-identified patent and that said Letters Patent is hereby corrected as shown below:

Title Page, Item (56)
On page 2, in column 2 under "Other Publications", line 19, delete "ACN/IEEE" and insert
-- ACM/IEEE --, therefor.

Title Page, Item (56)
On page 2, in column 2 under "Other Publications", line 28, delete "SIGSCE" and insert
-- SIGCSE --, therefor.

Title Page, Item (56)
On page 2, in column 2 under "Other Publications", line 40, delete "the1992" and insert
-- the 1992 --, therefor.

In column 4, line 30, after "10/840,180" insert -- , --.

In column 16, line 29, in claim 26, delete "niece" and insert -- piece --, therefor.

Signed and Sealed this
Nineteenth Day of April, 2011

David J. Kappos
*Director of the United States Patent and Trademark Office*